United States Patent
Read et al.

(10) Patent No.: US 11,858,861 B2
(45) Date of Patent: Jan. 2, 2024

(54) LOCALIZED PVB BASED TACKIFIER APPLICATION FOR CMC

(71) Applicant: Raytheon Technologies Corporation, Farmington, CT (US)

(72) Inventors: Kathryn S. Read, Marlborough, CT (US); John D. Riehl, Hebron, CT (US)

(73) Assignee: RTX Corporation, Farmington, CT (US)

(*) Notice: Subject to any disclaimer, the term of this patent is extended or adjusted under 35 U.S.C. 154(b) by 101 days.

(21) Appl. No.: 17/460,686

(22) Filed: Aug. 30, 2021

(65) Prior Publication Data

US 2023/0065975 A1    Mar. 2, 2023

(51) Int. Cl.
| | |
|---|---|
| *C04B 35/80* | (2006.01) |
| *C04B 35/628* | (2006.01) |
| *C04B 35/634* | (2006.01) |
| *C04B 35/638* | (2006.01) |

(52) U.S. Cl.
CPC ........ *C04B 35/80* (2013.01); *C04B 35/62863* (2013.01); *C04B 35/638* (2013.01); *C04B 35/6342* (2013.01); *C04B 2235/3826* (2013.01); *C04B 2235/5256* (2013.01); *C04B 2235/616* (2013.01)

(58) Field of Classification Search
CPC ............................ C04B 35/80; C04B 35/6342
See application file for complete search history.

(56) References Cited

U.S. PATENT DOCUMENTS

| | | | |
|---|---|---|---|
| 4,396,663 A * | 8/1983 | Mitchell | B32B 18/00 156/291 |
| 4,820,568 A | 4/1989 | Harpell et al. | |
| 4,852,347 A | 8/1989 | Reynolds et al. | |
| 5,067,998 A * | 11/1991 | Singh | C04B 37/008 156/181 |
| 8,747,730 B2 | 6/2014 | Riehl | |
| 10,822,280 B2 | 11/2020 | Harris et al. | |
| 2004/0086794 A1 | 5/2004 | Yamada et al. | |
| 2007/0096371 A1 | 5/2007 | McGuigan et al. | |
| 2012/0267833 A1 | 10/2012 | Riehl | |
| 2016/0031762 A1 | 2/2016 | Matsumoto | |
| 2017/0320785 A1* | 11/2017 | Matsumoto | B32B 18/00 |
| 2018/0061572 A1 | 3/2018 | Kano et al. | |
| 2019/0161413 A1 | 5/2019 | Jackson et al. | |

FOREIGN PATENT DOCUMENTS

WO    WO2014053751 A1    4/2014

OTHER PUBLICATIONS

Extended European Search Report for EP Application No. 22192319.6, dated Feb. 2, 2023, 8 pages.
Extended European Search Report for EP Application No. 22192489.7, dated Feb. 2, 2023, 8 pages.

* cited by examiner

*Primary Examiner* — Robert A Vetere
(74) *Attorney, Agent, or Firm* — Kinney & Lange, P.A.

(57) ABSTRACT

A method of forming a ceramic matrix composite includes applying a tackifier of ethanol and 3% to 12% polyvinyl butyral to a ceramic material, removing the ethanol from the ceramic material, and removing the polyvinyl butyral. The step of applying the tackifier includes one of a spraying, pipetting, painting, and immersing technique.

18 Claims, 1 Drawing Sheet

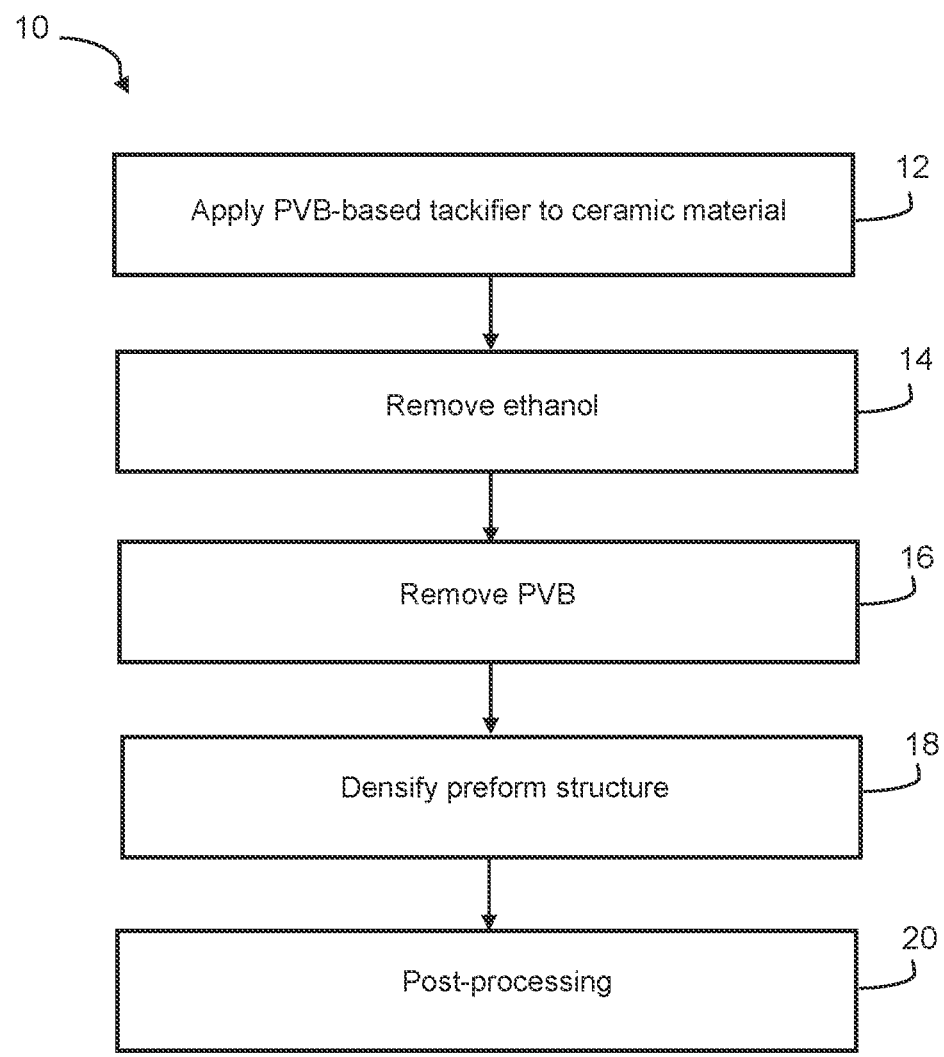

LOCALIZED PVB BASED TACKIFIER APPLICATION FOR CMC

BACKGROUND

The present invention relates to ceramic matrix composites and, more particularly, to preparing ceramic preforms for use in ceramic matrix composites.

Tackifiers can be used in the manufacture of ceramic matrix composites (CMCs) to stabilize fiber build materials for cutting, kitting, and handling operations. Tackifiers also help bind together fiber layers during lay-up. While some existing tackifiers sufficiently bind fiber layers, they are less well suited for fiber stabilization during processing and lack the requisite tack to enable efficient lay-up of complex structures. This can lead to a reduction in overall quality of the resulting CMC component, and/or an increase in manufacturing costs.

SUMMARY

A method of forming a ceramic matrix composite includes applying a tackifier comprising ethanol and 3% to 12% polyvinyl butyral to a ceramic material, removing the ethanol from the ceramic material, and removing the polyvinyl butyral. The step of applying the tackifier includes one of a spraying, pipetting, painting, and immersing technique.

An intermediate ceramic material for use in a ceramic matrix composite includes silicon carbide with 3% to 15% polyvinyl butyral.

BRIEF DESCRIPTION OF THE DRAWINGS

FIG. 1 is a flowchart illustrating a method of using a tackifier in the formation of a CMC.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a method of applying a polyvinyl butyral (PVB)-based tackifier to ceramic intermediate components/build material (e.g., sheets, tubes, preforms, etc.) of a CMC. The tackifier can be applied to the ceramic material during CMC manufacture by spraying or other local application techniques. Such techniques allow for the incorporation of the tackifier into more complex parts or features and those not easily formed from material pre-impregnated with the tackifier.

FIG. 1 is a flowchart illustrating method 10 of facilitating formation of a CMC using a tackifier on ceramic build material. To provide the desired level of tack and stabilization to the underlying ceramic material, the tackifier can be a mixture of PVB and ethanol. The amount of PVB in the tackifier compound can range from 3% to 12% in an exemplary embodiment. A range of 3% to 15% PVB is further contemplated herein. As used herein, a percentage of PVB should be understood as a percentage by weight (wt %). The remainder of the compound can be ethanol, or in some embodiments a combination of ethanol and inorganic particles such as silicon carbide particles. The relatively high ratio of ethanol to PVB provides a viscosity suitable for various localized application techniques, discussed in greater detail herein.

At step 12, the PVB-based tackifier can be applied to ceramic material used to form a CMC. This can occur prior to and/or during preforming as is discussed in greater detail below. In one embodiment, the ceramic material can be a sheet of ceramic fabric formed from, for example, tows of silicon carbide (e.g., Hi-Nicalon™) or other suitable ceramics in various woven architectures. The fabric can be dry or a pre-preg material. The tackifier can be applied to the sheet by spraying, pipetting, or painting, to name a few non-limiting examples. It can be desirable to slow or prevent evaporation of the ethanol within the tackifier after application using backing layers, films, bags, encapsulation, etc.

If not already in trimmed to the desired dimensions, the sheet can be cut into multiple plies to be laid up in a preform structure. The PVB-based tackifier helps stabilize the underlying woven fabric when the sheet is being cut such that there is little to no sheet distortion or fiber fraying. The plies cut from one or more sheets can be laid up in a an end-to-end and/or layer-by-layer fashion to form a multidimensional preform structure. In many cases, the preform structure can be supported by one or more sets of rigid tooling, formed from materials such as plastic, steel, aluminum, and or graphite. The tackifier gives each ply a reversible adhesive quality such that any ply can adhere to an underlying tooling surface or ply without shifting its position, while still allowing the ply to be removed and repositioned, if desired, without damaging the repositioned ply or any underlying plies. Similarly, in cases where one or more plies are bent or folded over to form a region of curvature or other complex geometry, the tackifier can cause areas where applied to remain in a bent or folded state and preforming operations can proceed with a reduced risk of needing to rework portions of the part.

In an alternative embodiment, the ceramic material being treated at step 12 can be a biaxial or triaxial braided ceramic (e.g., silicon carbide) material, such as a braided tube on a mandrel. Other three-dimensional structures are contemplated herein. Similar to the ceramic sheet, the tackifier can be applied to all or a portion of the braided material by any of spraying, pipetting, or painting during or after braiding. This allows for the initial formation of the braided architecture with a non-tackified ceramic material, preferable during the braiding process, and the subsequent reinforcement with the tackifier to facilitate handling. More specifically, the braided tube with applied tackifier can be incorporated into a preform structure with other tackified or non-tackified tubes and/or plies with the ability to be handled and modified with less likelihood of damage or distortion.

In yet another alternative embodiment, the ceramic material being treated at step 12 can be a preform structure in the nominal shape of the final component formed from one or more ceramic plies, braided tubes, etc. In such an embodiment, the tackifier can be applied locally by spraying, pipetting, or painting, or the preform structure and any underlying tooling can be immersed in a bath of the PVB-based tackifier. However carried out, the tackifier need not be applied to the entire preform structure. It should be noted that immersion can be used in other embodiments to treat sheets and/or braided tubes without departing from the scope of the invention. A preform treated in this manner can be, for example 3% to 15% PVB.

It is further possible for the PVB-based tackifier to be applied to the ceramic build materials during preforming. More specifically, the tackifier can be applied in any manner discussed above to plies and/or three-dimensional structures (e.g., tubes) as they are being incorporated into the preform. As with the previously-discussed embodiments, the tackifier can be broadly or selectively applied to areas requiring additional tack to become or remain adhered to another structure and/or to retain a certain shape during preforming. Such application of the tackifier also applies to materials previously treated (e.g., by local application or as a pre-preg) with the PVB-based or other tackifier if the solvent evaporates prematurely. In such cases, the PVB-based tackifier, preferably with a higher ethanol content (e.g., >95%), can be used to help restore the properties of the resin system.

For all embodiments, at step 14, the ethanol within the tackifier can be removed using one or a combination of heat and a vacuum, using, for example, a vacuum oven or other suitable equipment. After the ethanol has been removed, the PVB binds the various ceramic layers together and stabilizes/rigidizes the underlying structure. More specifically, when vacuum pressure and/or heat is no longer applied, the remaining PVB can help the underlying structure retain a compressed state. Step 14 can be carried out after preforming is complete, or in stages during preforming (e.g., in an embodiment with tackified plies).

At step 16, the PVB can be removed from the preform structure. In one embodiment, removal can constitute burning off/thermally decomposing the PVB by placing the preform in a nitrogen-rich ($N_2$) environment and exposing the preform to a temperature ranging from 500° F. (260° C.) to 1350° F. (732.2° C.), and in an exemplary embodiment, between 800° F. (426.7° C.) to 1150° F. (621.1° C.). In an alternative embodiment, the environment can include a mixture of nitrogen ($N_2$) and hydrogen ($H_2$) gases. The PVB burns off fairly cleanly, meaning that only insignificant amounts of ash from PVB, if any, remains after step 16. In an embodiment in which the tackifier includes inorganic (e.g., silicon carbide) particles, such particles remain incorporated into the preform structure after removal of the ethanol and PVB, and can facilitate matrix formation and densification. In another alternative embodiment, the PVB can be removed through other means by washing with ethanol or other suitable solvent without departing from the scope of the invention.

At step 18, the preform structure can undergo matrix formation and densification using one or a combination of chemical vapor infiltration or chemical vapor deposition (CVI or CVD). During densification, the plies are infiltrated by reactant vapors, and a gaseous precursor deposits on the fibers. The matrix material can be a silicon carbide or other suitable ceramic material. Densification is carried out until the resulting CMC has reached the desired residual porosity. In an alternative embodiment, densification can include other methodologies including, but not limited to, melt infiltration and polymer infiltration and pyrolysis (PIP).

At step 20, various post-processing steps can be performed, such as the application of one or more protective coatings (e.g., environmental and/or thermal barrier coatings). A bond coat can also be applied to facilitate bonding between the CMC and a protective coating. Other protective coatings, especially those suitable for use in a gas turbine engine environment, are contemplated herein. The resulting CMC formed with the tackified ceramic can be incorporated into aerospace, maritime, or industrial equipment, to name a few, non-limiting examples.

Discussion of Possible Embodiments

The following are non-exclusive descriptions of possible embodiments of the present invention.

A method of forming a ceramic matrix composite includes applying a tackifier of ethanol and 3% to 12% polyvinyl butyral to a ceramic material, removing the ethanol from the ceramic material, and burning off the polyvinyl butyral. The step of applying the tackifier includes one of a spraying, pipetting, painting, and immersing technique.

The method of the preceding paragraph can optionally include, additionally and/or alternatively, any one or more of the following features, configurations and/or additional components:

In the above method, the ceramic material can include a sheet of woven ceramic fabric, and the step of applying the tackifier can include one of spraying, pipetting, and painting.

Any of the above methods can further include forming a plurality of plies from the ceramic fabric sheet, and laying up the plurality of plies into a preform structure.

In any of the above methods, the step of removing the ethanol can include one or a combination of a heating the plurality of plies and applying a vacuum to the plurality of plies.

In any of the above methods, the step of removing the polyvinyl butyral can include one of burning off the polyvinyl butyral and washing the polyvinyl butyral with a solvent.

In any of the above methods, the step of burning off the polyvinyl butyral can include heating the preform structure to a temperature ranging from 500° F. to 1350° F. and placing the preform structure in a nitrogen-rich environment.

Any of the above methods can further include densifying the preform structure using one or a combination of chemical vapor infiltration, chemical vapor deposition, polymer infiltration and pyrolysis, and melt infiltration.

In any of the above methods, the ceramic material can include a braided ceramic material, and the step of applying the tackifier can include one of spraying, pipetting, and painting.

Any of the above methods can further include incorporating the braided ceramic material into a preform structure.

In any of the above methods, the step of removing the ethanol can include one or a combination of a heating the plurality of plies and applying a vacuum to the plurality of plies.

In any of the above methods, the step of removing the polyvinyl butyral can include one of burning off the polyvinyl butyral and washing the polyvinyl butyral with a solvent.

In any of the above methods, the step of burning off the polyvinyl butyral can include heating the preform structure to a temperature ranging from 500° F. to 1350° F. and placing the preform structure in a nitrogen-rich environment.

Any of the above methods can further include densifying the preform structure using one or a combination of chemical vapor infiltration, chemical vapor deposition, polymer infiltration and pyrolysis, and melt infiltration.

In any of the above methods, the ceramic material can include a ceramic preform structure, and the step of applying the tackifier can include one of spraying, pipetting, painting, and immersing.

In any of the above methods, the step of removing the ethanol can include one or a combination of a heating the plurality of plies and applying a vacuum to the plurality of plies.

In any of the above methods, the step of removing the polyvinyl butyral can include one of burning off the polyvinyl butyral and washing the polyvinyl butyral with a solvent.

In any of the above methods, the step of burning off the polyvinyl butyral can include heating the preform structure to a temperature ranging from 500° F. to 1350° F. and placing the preform structure in a nitrogen-rich environment.

Any of the above methods can further include densifying the preform structure using one or a combination of chemical vapor infiltration, chemical vapor deposition, polymer infiltration and pyrolysis, and melt infiltration.

In any of the above methods, the tackifier can further include inorganic particles.

An intermediate ceramic material for use in a ceramic matrix composite includes silicon carbide with 3% to 15% polyvinyl butyral.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite, the method comprising:
   applying a composition to a preform of ceramic material, the composition comprising:
      3% to 15% polyvinyl butyral with a remainder of the composition being ethanol;
   removing the ethanol from the ceramic material; and
   removing the polyvinyl butyral; and
   densifying the preform structure with a matrix,
   wherein the step of applying the composition comprises one of a spraying, pipetting, painting, and immersing technique.

2. The method of claim 1, wherein the ceramic material comprises a sheet of woven ceramic fabric, and wherein the step of applying the composition comprises one of spraying, pipetting, and painting.

3. The method of claim 2 and further comprising:
   forming a plurality of plies from the ceramic fabric sheet; and
   laying up the plurality of plies into a preform structure.

4. The method of claim 3, wherein the step of removing the ethanol comprises one or a combination of heating the plurality of plies and applying a vacuum to the plurality of plies.

5. The method of claim 4, wherein the step of removing the polyvinyl butyral comprises one of burning off the polyvinyl butyral and washing the polyvinyl butyral with a solvent.

6. The method of claim 5, wherein the step of burning off the polyvinyl butyral comprises heating the preform structure to a temperature ranging from 500° F. to 1350° F. and placing the preform structure in a nitrogen-rich environment.

7. The method of claim 6, wherein densifying the preform structure comprises one or a combination of chemical vapor infiltration, chemical vapor deposition, polymer infiltration and pyrolysis, and melt infiltration.

8. The method of claim 3, wherein the step of removing the ethanol comprises one or a combination of heating the preform structure and applying a vacuum to the preform structure.

9. The method of claim 8, wherein the step of removing the polyvinyl butyral comprises one of burning off the polyvinyl butyral and washing the polyvinyl butyral with a solvent.

10. The method of claim 9, wherein the step of burning off the polyvinyl butyral comprises heating the preform structure to a temperature ranging from 500° F. to 1350° F. and placing the preform structure in a nitrogen-rich environment.

11. The method of claim 10, wherein densifying the preform structure comprises one or a combination of chemical vapor infiltration, chemical vapor deposition, polymer infiltration and pyrolysis, and melt infiltration.

12. The method of claim 1, wherein the ceramic material comprises a braided ceramic material, and wherein the step of applying the composition comprises one of spraying, pipetting, and painting.

13. The method of claim 12 and further comprising: incorporating the braided ceramic material into a preform structure.

14. The method of claim 1, wherein the ceramic material comprises a ceramic preform structure, and wherein the step of applying the composition comprises one of spraying, pipetting, painting, and immersing.

15. The method of claim 14, wherein the step of removing the ethanol comprises one or a combination of heating the preform structure and applying a vacuum to the preform structure.

16. The method of claim 15, wherein the step of removing the polyvinyl butyral comprises one of burning off the polyvinyl butyral and washing the polyvinyl butyral with a solvent.

17. The method of claim 16, wherein the step of burning off the polyvinyl butyral comprises heating the preform structure to a temperature ranging from 500° F. to 1350° F. and placing the preform structure in a nitrogen-rich environment.

18. The method of claim 17, wherein densifying the preform structure comprises one or a combination of chemical vapor infiltration, chemical vapor deposition, polymer infiltration and pyrolysis, and melt infiltration.

* * * * *